(12) United States Patent
Velten et al.

(10) Patent No.: US 11,495,078 B2
(45) Date of Patent: Nov. 8, 2022

(54) AUTOMATED BAKERY KIOSK WITH ORDER CUSTOMIZATION

(71) Applicant: Walmart Apollo, LLC, Bentonville, AR (US)

(72) Inventors: Jeremy L. Velten, Bella Vista, AR (US); Kurt William Robert Bessel, Mexico, NY (US)

(73) Assignee: Walmart Apollo, LLC, Bentonville, AR (US)

( * ) Notice: Subject to any disclaimer, the term of this patent is extended or adjusted under 35 U.S.C. 154(b) by 390 days.

(21) Appl. No.: 16/711,676

(22) Filed: Dec. 12, 2019

(65) Prior Publication Data

US 2020/0193759 A1 Jun. 18, 2020

Related U.S. Application Data

(60) Provisional application No. 62/779,710, filed on Dec. 14, 2018.

(51) Int. Cl.
*G07F 11/70* (2006.01)
*G06Q 30/06* (2012.01)
(Continued)

(52) U.S. Cl.
CPC .......... *G07F 11/70* (2013.01); *G05B 19/4155* (2013.01); *G06Q 30/0621* (2013.01); *G07C 9/00309* (2013.01); *G05B 2219/37431* (2013.01)

(58) Field of Classification Search
CPC ............ G06Q 30/0621; G07F 17/0078; G05B 2219/37431
See application file for complete search history.

(56) References Cited

U.S. PATENT DOCUMENTS 6,903,841 B2 6/2005 Spurgeon et al.
9,633,384 B2 4/2017 Casey
(Continued)

FOREIGN PATENT DOCUMENTS

CN 204270399 U * 4/2015
CN 204390349 U * 6/2015
(Continued)

OTHER PUBLICATIONS

International Search Report and Written Opinion in PCT/US2019/065864 dated Feb. 14, 2020; 18 pages.
(Continued)

*Primary Examiner* — Vincent H Tran (57) ABSTRACT

An automated bakery kiosk 1000 takes orders for customized bakery products 7, prepares the bakery product 7, automatically customizes it, stores and dispenses the bakery product 7 with minimal assistance required from a store associate 5. It employs a customization subsystem 1100 which can write or decorate with an edible liquid 9, such as icing, on the bakery product 7. It also has temperature-controlled storage compartments 1100 which can be used to thaw the bakery product 7 so that it will be ready when it reaches its ultimate destination. There is a cleaning subsystem 1131 which cleans out the liquid 9, and an antimicrobial system 1139 which reduces microbes on the customization device 1100. The automated bakery kiosk 1000 also has a customer interface 1610 that works with the processor 1510 and transport mechanism 1300 to transport the customer's bakery product 7 to a pick-up compartment 1020 when the customer 3 provides a proper code to access the bakery product 7.

19 Claims, 4 Drawing Sheets

(51) Int. Cl.
  *G05B 19/4155* (2006.01)
  *G07C 9/00* (2020.01)

(56) References Cited

U.S. PATENT DOCUMENTS

| | | | | |
|---|---|---|---|---|
| 10,885,492 | B2 * | 1/2021 | Goldberg | G07F 9/001 |
| 11,253,585 | B2 * | 2/2022 | Smith | A61P 31/14 |
| 2002/0040564 | A1 * | 4/2002 | Killingbeck | A47G 29/20 53/416 |
| 2012/0185086 | A1 * | 7/2012 | Khatchadourian | G07F 11/70 99/345 |
| 2014/0060104 | A1 * | 3/2014 | Shur | F25D 17/042 250/492.1 |
| 2014/0316916 | A1 * | 10/2014 | Hay | G06Q 20/20 705/17 |
| 2015/0019354 | A1 | 1/2015 | Chan et al. | |
| 2016/0171591 | A1 * | 6/2016 | Williams | G06Q 30/0635 705/26.81 |
| 2016/0203543 | A1 * | 7/2016 | Snow | G06Q 30/0635 705/26.81 |
| 2016/0338545 | A1 * | 11/2016 | Shah | A47J 36/321 |
| 2017/0011442 | A1 * | 1/2017 | Hu | G07F 13/10 |
| 2017/0161676 | A1 | 6/2017 | Aji | |
| 2017/0258257 | A1 | 9/2017 | Guh | |
| 2017/0265515 | A1 * | 9/2017 | Davila | A23P 20/20 |
| 2018/0127192 | A1 * | 5/2018 | Cohen | G07F 17/0064 |
| 2018/0134492 | A1 * | 5/2018 | Lert, Jr. | G05B 19/41815 |
| 2019/0051083 | A1 * | 2/2019 | Goldberg | G06Q 20/18 |
| 2019/0297899 | A1 * | 10/2019 | Weiss | A21B 3/07 |
| 2019/0310611 | A1 * | 10/2019 | Jain | G01F 13/005 |
| 2020/0184530 | A1 * | 6/2020 | Anderson | B33Y 80/00 |
| 2020/0200393 | A1 * | 6/2020 | Goldberg | B60P 3/0257 |
| 2020/0214473 | A1 * | 7/2020 | Weiss | A47F 3/02 |

FOREIGN PATENT DOCUMENTS

| | | | | |
|---|---|---|---|---|
| CN | 106097070 A | * | 11/2016 | |
| CN | 110135926 A | * | 8/2019 | |
| CN | 109195446 B | * | 6/2021 | A21C 15/002 |
| WO | WO-2016006736 A1 | * | 1/2016 | A47J 27/04 |
| WO | WO-2019014030 A1 | * | 1/2019 | B25J 11/0045 |

OTHER PUBLICATIONS

Maras, Elliot "Automated restaurants are on the way; here's a sneak peek," Aug. 30, 2017, KioskMarketplace.com. https://www.kioskmarketplace.com/articles/automated-restaurants-are-on-the-way-heres-a-sneak-peek/.

New York Magazine, "In Boston, These Robots Are Now Serving Up $8 Salads and Bowls," May 3, 2018, YouTube.com, VIDEO. https://www.youtube.com/watch?v=rfMZfxgbuCw.

CNET, "Cafe X robot barista makes custom coffee," Jan. 30, 2017, YouTube.com. VIDEO. https://www.youtube.com/watch?v=t42XCAChUN8.

Techcrunch, "Zume delivers made-to-order pizza with robots," Sep. 5, 2016, YoutTube.com VIDEO. https://www.youtube.com/watch?v=uFSdxwRVh8A.

CNBC, "Futuristic Restaurant Eatsa Replaces Cashiers With iPads," Sep. 28, 2015, YouTube.com. VIDEO. https://www.youtube.com/watch?v=QVweHrTY31g.

TechCrunch, "A robot cooks burgers at startup restaurant Creator," Jun. 21, 2018, YouTube.com, VIDEO. https://www.youtube.com/watch?v=CbL_3le40qc.

* cited by examiner

AUTOMATED BAKERY KIOSK WITH ORDER CUSTOMIZATION

RELATED APPLICATIONS

This application claims the benefit of U.S. Provisional Patent Application No. 62/779,710 filed Dec. 14, 2018 entitled "Automated Bakery Kiosk with Order Customization" the content of which is incorporated by reference herein in its entirety.

BACKGROUND

Technical Field

Aspects of the present invention relate to a bakery kiosk which can automatically prepare, store and dispense bakery products without the need for employee assistance; and more particularly to a bakery kiosk which can automatically customize, prepare, store and dispense bakery products without the need for employee assistance.

Description of Related Art

Typically, a customer may order a bakery product, such as a cake, from an employee of a store or bakery remotely, that is picked up at a later time. This is common with cakes which have customized messages written on them in icing.

If the customer arrives at the store or bakery after it has closed, he/she cannot pick up the bakery product. It is common for in-store bakeries in supermarkets to close before the supermarket. In this case, the customer may arrive to be allowed into the supermarket, but still cannot receive the bakery product that was ordered.

Since orders are typically taken verbally over the phone, there are miscommunications which result in incorrect orders. Also, the employee may miscalculate how long it will take to complete the order, which results in incorrect pick-up time, which causes the customer to have to wait for their order.

Finally, it takes employee time to receive orders when they can be doing more productive work at the bakery or store.

Also, certain bakery products are frozen when they arrive in the stores/bakeries. These are required to be thawed at a certain rate and over a specified period of time before they can be used. Commonly, these may be fully thawed when the customer picks up the bakery product but deteriorates when driven a long while in a car back to the customer's house.

Also, the bakery product customization is time-consuming and delays completion of order. If there are a significant number of orders, it may require additional bakery personnel to meet the demand.

Currently, there is a need for an automated bakery kiosk than can automatically take orders, customize bakery products quickly and efficiently, and dispense the bakery products to customers without the assistance of employees.

SUMMARY

According to aspects of the present invention, an apparatus and method are provided as set forth in the appended claims. Other features of the inventive concepts will be apparent from the dependent claims, and the description which follows.

In one example there is described an automated bakery kiosk having a plurality of temperature-controlled storage compartments each adapted to hold a bakery product, a lockable pick-up compartment which can be accessed by a customer using a code, a transport mechanism which can transport the bakery product from one of the storage compartments to another compartment where the customer may access the bakery product, a customer interface adapted to receive customer input defining a desired bakery product and to indicate a day and time to pick up the bakery product, and at least one of a heating unit and refrigeration unit coupled to the storage compartments. There is a customization system that responds to customer input from the customer interface to customize the bakery product. There is also a controller coupled to the customer interface, the storage compartments, the transport mechanism and the pick-up compartment and adapted to receive the customer input, then adjust a temperature of the storage compartment to bring the bakery product to the proper temperature when it is intended to be picked up, and operate the transport mechanism to move the bakery product to the pick-up compartment at a pick-up time and provide a code to the customer to use to open the lockable pick-up compartment.

The automated bakery kiosk may be further modified such that the customer interface is adapted to receive information as to custom bakery item decoration, and further includes a decoration device responsive to the customer interface to perform the custom decorations.

More specifically, the automated bakery kiosk may include a decoration device that has a nozzle assembly which expels a liquid food used for decoration, at least one line transporting the liquid food, a liquid food source adapted to force liquid food through the lines to, and out of the nozzle assembly, nozzle actuators, coupled to the nozzle assembly which moves the nozzle assembly to desired locations on top of the bakery product to expel liquid food at these desired locations, thereby creating decorations or writing.

The automated bakery kiosk may further comprise a pressurized air source coupled to the lines to provide compressed air through the lines to purge the liquid food from the lines and nozzle assembly after use. The embodiment of the automated bakery kiosk may further include a water source coupled to the lines to provide water through the lines to wash the lines and nozzle assembly after use.

In another alternative embodiment, the automated bakery kiosk may further include an antimicrobial light source positioned to shine on and through the lines and nozzle assembly after use to reduce microbes on their surfaces.

In the automated bakery kiosk described above, the compartments are temperature-controlled and are coupled to at least one of a heater and a refrigeration unit that are controlled by the controller.

Further, in the automated bakery kiosk embodiment described above, the customer interface is constructed from a communication device coupled to the controller adapted to communicate with another computing device; and a remote computing device having hardware and software adapted to receive customer input defining a bakery product and its customization and communicate this information to the communication device and controller.

The automated bakery kiosk may be embodied as indicated above wherein the customer interface acquires information as to how long it will take the customer to transport the bakery product to its intended destination and thaws the bakery product to the temperature which it will cause it to be fully thawed when the customer reaches their intended destination.

The automated bakery kiosk described above, wherein the storage compartments have actuators to open their top side, and the transport mechanism has a gantry frame, gantry legs and actuators, capable of picking up the bakery product out of a storage compartment through its open top side.

The automated bakery kiosk embodiment described above, also having a cleaning system using a steam source and lines coupling the steam source to the nozzle assembly to expel excess liquid food out of the lines and nozzle assembly.

The automated bakery kiosk described above that further includes a packaging device which packages the customized bakery product prior to moving it to the pick-up compartment 1.

The Automated Bakery Kiosk system may use conventional packaging equipment for packaging device. A placer and product loading conveyor may be used from:

In Line Plastics Corp.
42 Canal Street
Shelton, Conn. 06484
https://www.inlineplastics.com/why-inline-plastics/automation/

The placer and product loader can place a standard open clam shell package in the customization area. The bakery product is then placed in the open clam shell package.

In this embodiment, the bakery product can then be customized as indicated above, but now in the open clam shell.

The clam shell and then the lid is then closed with a closing machine such as the Safe-T-Fresh® High Speed Closing Machine, also from In Line Plastics and shown on the same website.

A label is then printed and attached to the package using a conventional label printer such as Tamper-Evident Labeling System, also from In Line Plastics resulting in a packaged bakery product ready to provide to the customer.

It is within the spirit of this invention to replace the specific packaging equipment disclosed here by other conventional packaging systems that automatically package the bakery products.

The current invention may also be embodied as a method of automatically preparing and customizing bakery products by providing a plurality of bakery products in storage compartments, receiving customer input to select a bakery product, receiving customer input indicating customization of the bakery product, the pick-up time and date, automatically customizing the bakery product according to the customer input, adjusting the temperature of the bakery product such that it is at the proper temperature at the pick-up time and date.

The method described above wherein the customer input indicates the bakery product desired, the size and bakery product customization options.

The method described above further including packaging the customized bakery product with a packaging device prior to moving it to the pick-up compartment.

The method described above also including the step of determining if there is less than a minimum amount of materials immediately available to make and customize a bakery product as requested by the customer, and if there is less than a minimum amount indicating to the customer that the requested bakery product cannot be made at this time.

The method described immediately above also including the step of automatically ordering the materials that were determined to be less than the minimum amount immediately available, to replenish them.

The current invention may be described as an automated kiosk having a plurality of storage compartments each adapted to hold a bakery product, at least one heating chamber functioning to thaw or heat a bakery product, at least one refrigeration chamber functioning to cool or freeze a bakery product, at least one customization system functioning to customize the bakery product, at least one customization area which can be accessed by the customization devices where the bakery product is customized, a transport mechanism which can transport a bakery product from one of the storage compartments to the customization area for customization, to one of a heating chamber for thawing or heating the bakery product, a refrigeration chamber for cooling or freezing the bakery product, and a pick-up compartment for pickup by a customer, and a customer interface adapted to receive customer input defining a desired bakery product, its customization and a day and time to pick up the bakery product.

The automated bakery kiosk may also include a controller coupled to the customer interface, the storage chambers, heating chambers, refrigeration chambers, customization system, transport mechanism and lockable pick-up compartment and adapted to receive the customer input, operate the transport mechanism to transport the bakery product to one of the heating chamber, the refrigeration chamber to bring the bakery product to a proper temperature at the time and date that it is intended to be picked up, and further operate the transport mechanism to move the bakery product to the pick-up compartment when the customer provides an appropriate code to access the customized bakery product.

The automated kiosk described immediately above may also include a plurality of sensors adapted to measure at least one of temperature, humidity and bacterial count at various locations within the automated kiosk, and the controller is adapted to receive the temperature, humidity and bacterial count measured by sensors and act to make proper adjustments based upon the received measured information.

The automated kiosk described able wherein the materials are ordered through an electronic communication device.

BRIEF DESCRIPTION OF DRAWINGS

The above and further advantages may be better understood by referring to the following description in conjunction with the accompanying drawings, in which like numerals indicate like structural elements and features in various figures. The drawings are not necessarily to scale, emphasis instead being placed upon illustrating the principles of the concepts. For example, the dimensions of some of the elements in the figures may be exaggerated relative to other elements to help to improve understanding of various example embodiments. Also, common but well-understood elements that are useful or necessary in a commercially feasible embodiment are often not depicted in order to facilitate a less obstructed view of these various example embodiments.

DETAILED DESCRIPTION

At least some of the following exemplary embodiments provide an improved system and method suitable for providing an automated bakery kiosk. Many other advantages and improvements will be discussed in more detail below or will be appreciated by the skilled person from carrying out exemplary embodiments based on the teachings herein. The exemplary embodiments have been described particularly in relation to a retail store such as a supermarket or general store for grocery and household items. However, it will be appreciated that the example embodiments may be applied in many other specific environments.

Theory

Most bakery products are delivered frozen and are thawed before providing them to a customer. Thawing bakery products 7 and offering them for sale significantly lowers their shelf life. Therefore, if one would know in advance when a bakery product is to be picked up, it can remain frozen for the longest period before pickup but still be thawed when picked up.

If the customer is not immediately using the bakery product 7 after pickup, and indicates when it will be used, the bakery product 7 can be partially thawed such that it will be fully thawed at its final destination. Take for example, the case where a customer would like to pick up a birthday cake but drive it an hour to the birthday party in the summer. The system can calculate how long to thaw the cake, if at all.

Another issue with some bakery production facilities, such as bakeries, is that they may be in a larger store or mall and typically close earlier than the store/mall. In this case it is inconvenient that the customer cannot pick up the cake.

Finally, some of the delay in providing a bakery product 7 is introduced by manually writing messages on the cake with icing. This is common for writing the person's name on the cake following a message such as "Happy Birthday". When there begins to be many bakery products 7 which require customization, it can cause delays for the customers.

Automatic or mechanized systems can customize many more bakery products 7 in the same time period.

Implementation

Figure 1:
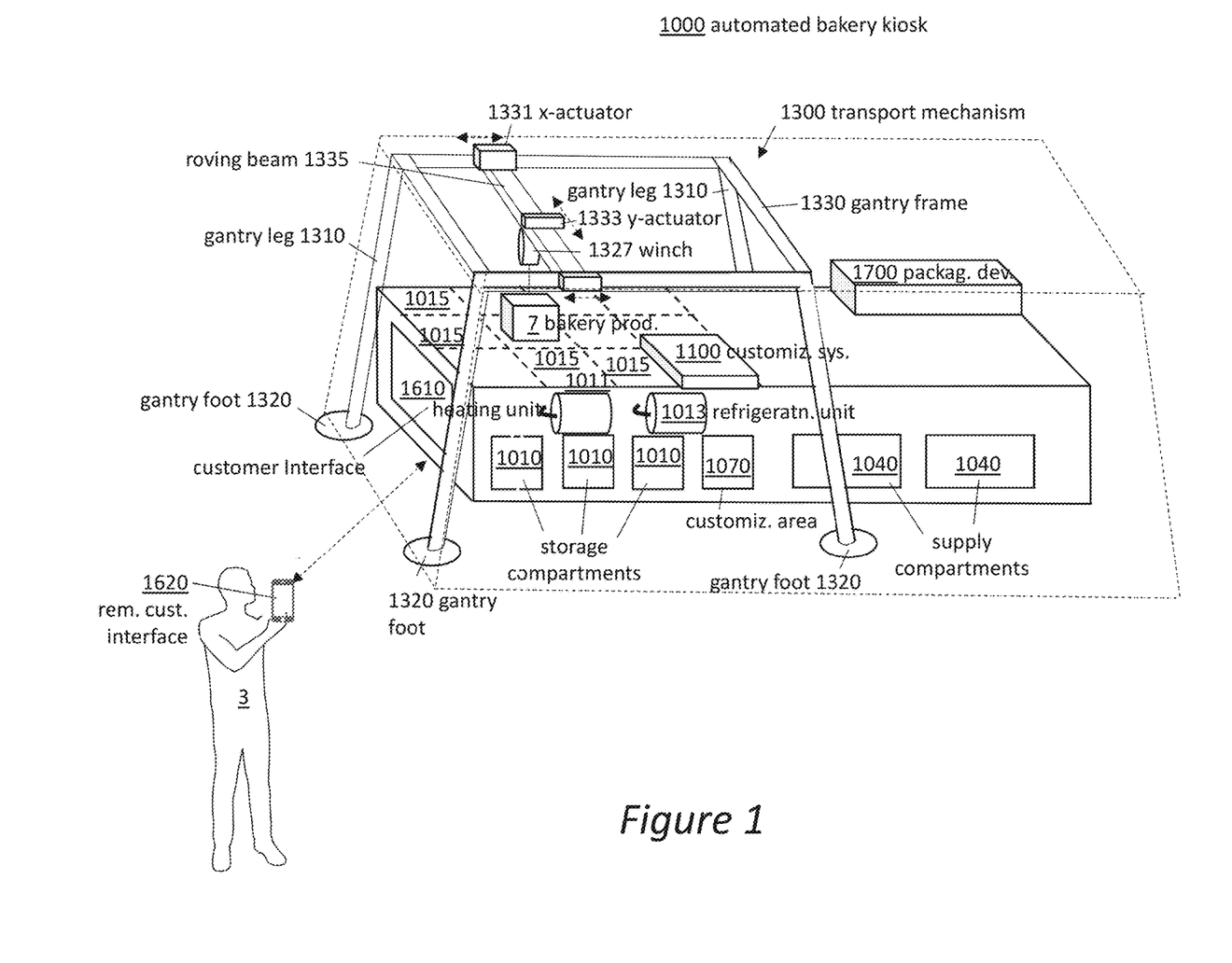
FIG. 1 is a perspective view of a system according to one embodiment of an automated bakery kiosk according to the current invention.

FIG. 1 is a perspective view of a system according to one embodiment of an automated bakery kiosk according to the current invention.

In FIG. 1, a customer 3 would like a customized birthday cake for a party being held tomorrow, which is a one-hour drive away. If the customer is in the store, he/she could interact directly with a customer interface 1610 on an automated bakery kiosk 1000 located within a retail establishment, such as a store or mall.

The customer can select many different aspects of the bakery product 7, such as a sheet or round cake, cupcakes, or other bakery products, the flavor (chocolate, vanilla, marble), size (half-sheet, full sheet), icing flavor/color, writing on the cake, and even upload pictures to be printed on the cake.

If customer 3 is not in the vicinity of the automated bakery kiosk 1000, he/she can start an App on their remote computing device 1620 which may be a smartphone, tablet, laptop, desktop, etc.

The automated bakery kiosk 1000 includes a plurality of storage compartments 1010, each capable of storing at least one bakery product 7.

A processor and memory (shown in FIG. 4) keep track of which bakery products are stored in which storage compartments 1010. There are also 'occupied' sensors in the storage compartments which can tell if there is a bakery product 7 in a storage compartment 1010.

In one embodiment, the heating unit 1011 is connected to at least one of the storage compartments 1010 and can heat them to a desired temperature.

Similarly, the refrigeration unit 1013 is connected to at least one of the storage compartments 1010 and refrigerates the storage compartments 1010 to a desired temperature.

In this embodiment, the storage compartments 1010 have a retractable topside 1015. The retractable topsides 1015 each have an actuator that functions to retract the top side 1015 to open and provide access to the inside of storage compartment 1010.

In one embodiment, a transport mechanism 1300 picks up and moves a selected bakery product from its storage compartment 1010 to a customization area, which may be a customization compartment 1070. The transport mechanism includes a gantry frame 1330 held by gantry legs 1310, and gantry feet 1320. A pair of x-actuators 1331 move a roving beam 1335 back and forth in an x-direction. A y-actuator 1333 moves a winch 1337 in a y direction. The winch 1337 extends to attach to a tray under the bakery product 7 and lifts it out to transport it and lowers it at a new location.

A customization system 1100 is shown above the customization compartments. This may retract to allow the bakery product 7 to be placed inside the customization compartment 1070.

Figure 2:
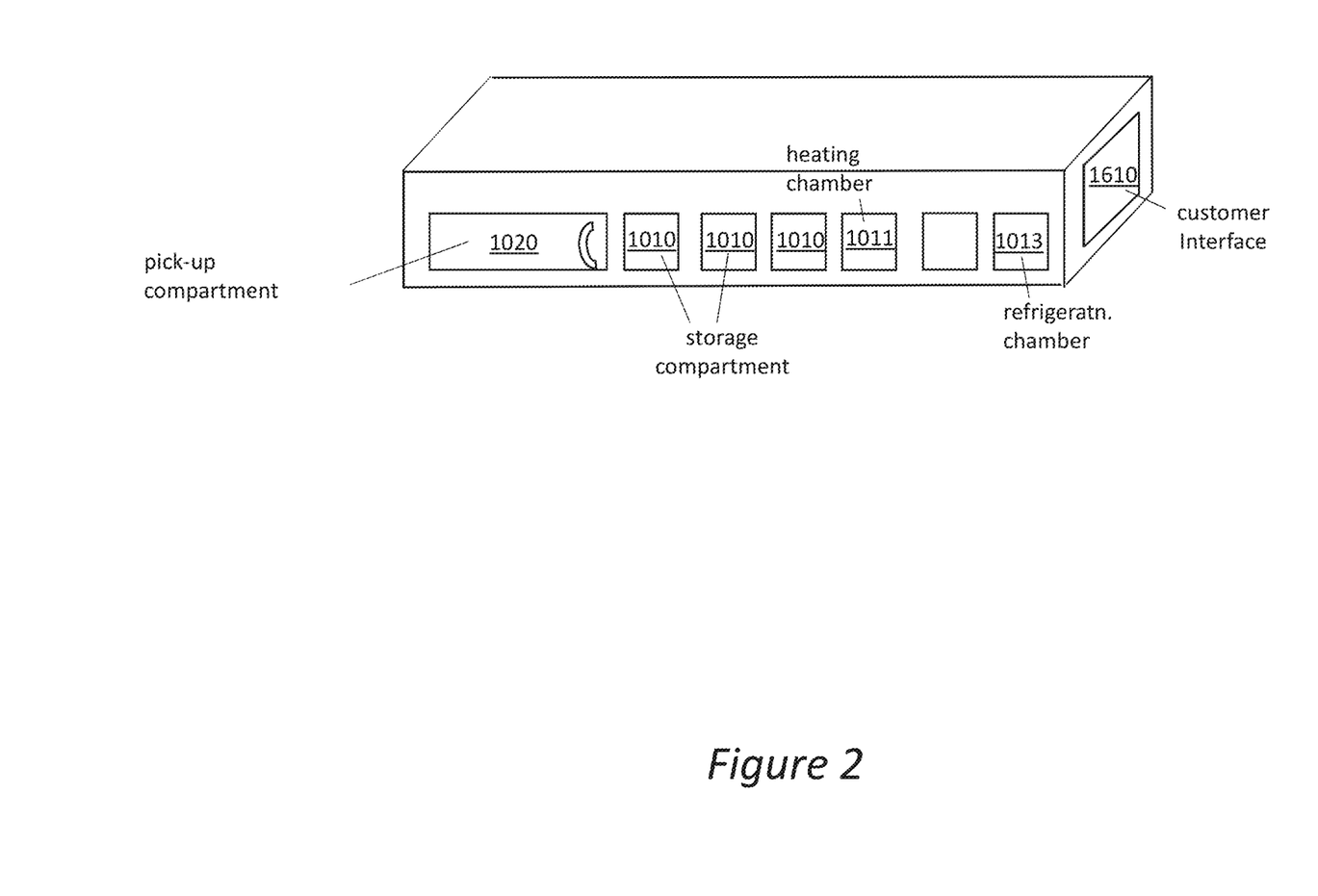
FIG. 2 is a perspective view of a portion of the automated bakery kiosk shown in FIG. 1.

FIG. 2 is a perspective view of a portion of the automated bakery kiosk shown in FIG. 1.

FIG. 2 shows the compartments of the current invention from the opposite side as that of FIG. 1. This view excludes elements such as the transport mechanism 1300, packaging system 1700, customization system 1100, and other structures above the compartments.

In the previous embodiments, the storage compartments 1010 are temperature controlled such that each can be individually heated or refrigerated by heating unit 1011 or refrigeration unit 1013, respectively. Therefore, bakery products 7 could be stored in a frozen state or thawed as required.

In the embodiment of FIG. 2, there may be specialized heating chambers 1050 and specialized refrigeration chambers 1060. In this embodiment, bakery products 7 may be moved into either of these chambers 1050, 1060 for additional heating or refrigeration.

FIG. 2 also shows the pick-up compartment 1020 where the customers 3 pick-up their bakery product.

Figure 3:
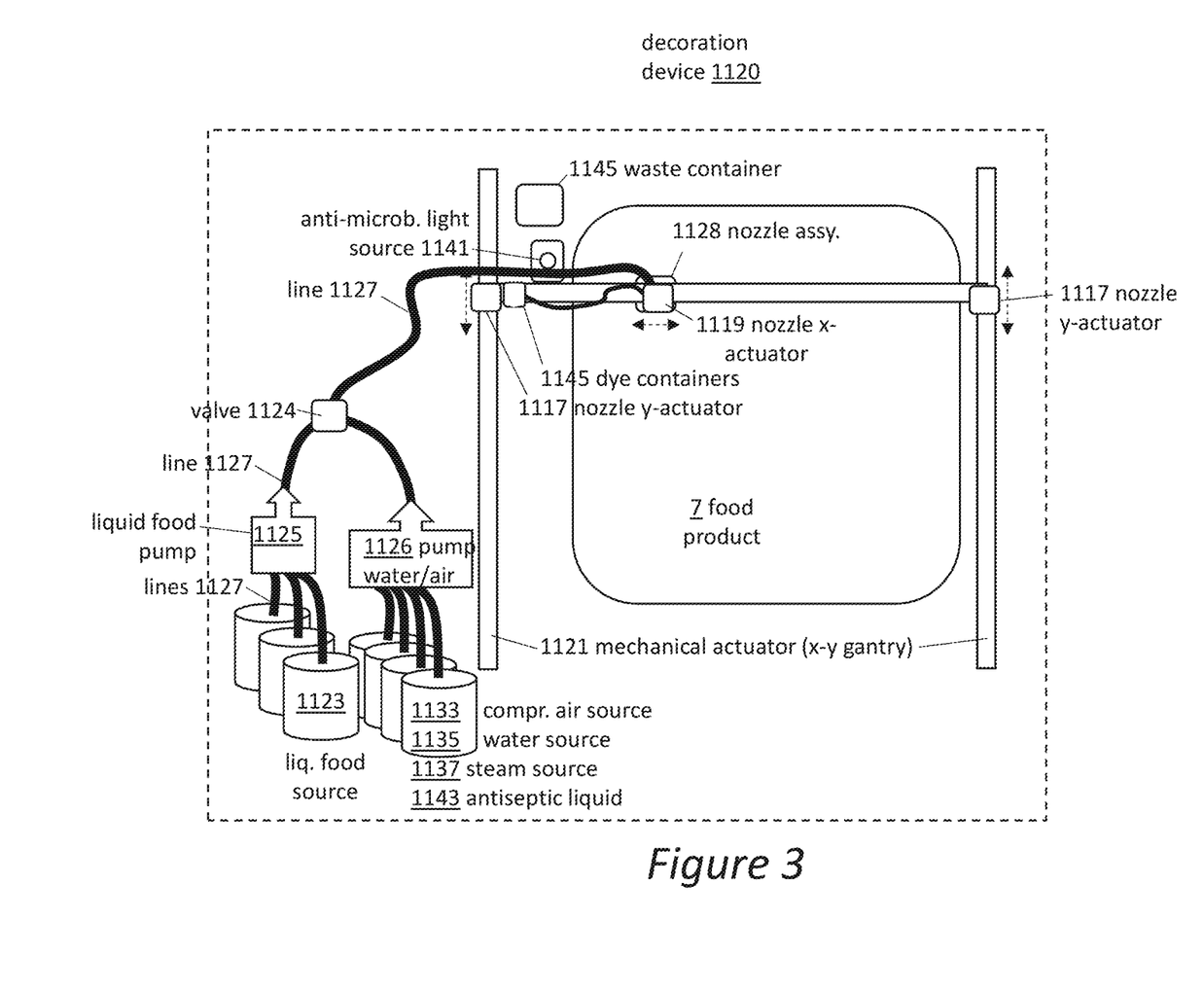
FIG. 3 is a detailed plan view of an embodiment of a decoration device 1120 of the customization system 1100 shown in FIG. 1.

FIG. 3 is a detailed plan view of an embodiment of a decoration device 1120 of the customization system 1100 shown in FIG. 1.

Decoration Device—Icing Writer

In this embodiment, liquid food sources 1123 provide liquid food 9, such as icing, which is used to decorate a bakery product. The liquid food 9 is typically pumped through a valve 1124 and line 1127 to a nozzle (not shown) in a nozzle assembly 1128. The nozzle assembly 1128 allows the nozzle to expel the liquid food at desired locations.

A mechanical actuator 1121 has a pair of y-actuators 1117 which move a roving beam 1335 holding the nozzle assembly 1128 in a direction up and down the page, referred to as the "Y" direction. A nozzle x-actuator 1119 functions to move the nozzle assembly 1128 to the left and right of the page.

When the nozzle assembly 1128 is properly coordinated with the mechanical actuator 1121, it can decorate any location on the bakery product 7 and can 'write' messages on it.

Decoration Device—Image Air Brush

The structures of FIG. 3 described above to write the liquid food 9 on bakery product 7 may also be used to print an image line by line across bakery product 7. This process may be similar to that used by the old dot matrix printers.

The nozzle assembly 1128 receives dye through tubes from a set of dye containers 1125.

The dyes in these dye containers are edible dyes, such as vegetable food coloring dyes. These are used as 'ink' similar to that of a color inkjet printer. Varying amounts of each of the dyes are printed on the bakery product 7 by inkjet to create the desired colors.

As the nozzle x-actuator 1119 and nozzle y-actuator 1117 scan the nozzle assembly 1128 line by line across the bakery product, the inkjet colors create the desired image on the surface of the bakery product 7.

Figure 4:
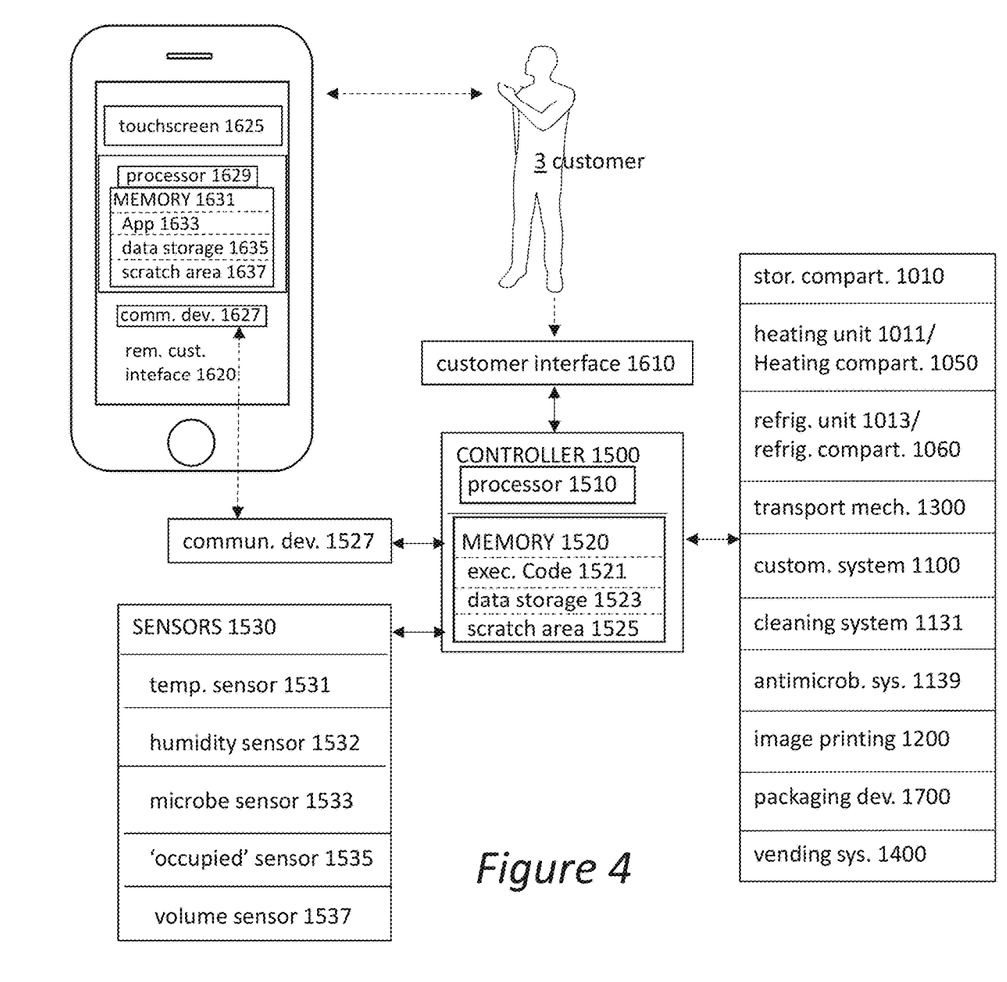
FIG. 4 is a schematic representation of the elements of the automated bakery kiosk and their interconnections.

Please note that other conventional, known methods of printing an image on the bakery product 7 may also be used, such as using airbrush technology, or printing on an edible film which is applied to the surface of the bakery product 7. The decoration device may also employ an image printer which prints on edible paper that is laid on top of the bakery product 7. One such printer which would be compatible with the current invention is the "Edible Printer Bundle-Brand New Canon All-in-One Printer with Edible Paper and Inks by PC Universal" found on Walmart.com. More specifically, it can be found at the following link:
https://www.walmart.com/ip/Edible-Printer-Bundle-Brand-New-Canon-All-in-One-Printer-with-Edible-Paper-and-Inks-by-PC-Universal/
113766313?adid=22222222254418684945&wmlspartner=wmtlabs&wl0=b&wl1=s&wl2=c&wl3=291938340609&wl4=dsa-504748227745&wl5=2840&wl6=&wl7=2840&wl8=&veh=sem&gclid=EAIaIQobChMI8pTfoNj43gIVdB6tBh165JJEAAYAyAAEgLolPD_BwE FIG. 4 is a schematic representation of the elements of the automated bakery kiosk and their interconnections. The invention will now be described with reference to FIGS. 1-4.

A customer 3 interacts directly with the customer interface 1610 in the store at the automated bakery kiosk 1000 or uses his/her remote computing device which acts as a remote customer interface 1620 to make the order. The customer 3 then provides customer input to select bakery product parameters and customization parameters.

A controller 1500 monitors any input received from customer interface 1610. Controller 1500 includes a processor 1510, which accesses memory 1520 and runs executable code 1521. It can also look up stored data in data storage 1523 and store temporary information in scratch area 1525.

Controller 1500 then looks in memory 1520 data storage 1523 to determine which bakery products most closely match the request of customer 3. The processor 1510 then interacts with customer 3 through customer interface 1610 to verify that this is the proper bakery product.

The processor 1510 then looks up the bakery product in the data storage 1523 to determine the storage compartment 1010 in which the bakery product has been stored. It also reads the 'occupied' sensor 1535 to make sure the product is there and has not been sold or discarded. The processor 1510 may interact with the customer 3 to verify that the bakery product is what the customer 3 is requesting.

The processor 1510 also then checks the volume sensors 1537 to check if there is at least a minimum amount of materials used for customization. If there is not, the processor 1510 notifies the customer 3 through the customer interface 1610 that it is not able to customize the bakery product.

Once the bakery product and sufficient amount of materials have been verified, processor 1510 determines if it is frozen and must be thawed.

If so, processor 1510 then asks questions through customer interface 1610 of customer 3 to determine the location of the ultimate destination of the bakery products. The processor 1510 then makes some calculations, possibly using GPS to estimate travel time, and determines how long it would be between pick-up and use. It also estimates outside temperature and determines the amount of thawing that should occur such that it is totally thawed and ready to eat at its intended destination.

The processor 1510 then determines the storage compartment 1010 having the desired bakery product. It then reads the temperature sensor 1531 in the determined compartment and, if necessary, stops the refrigeration unit 1013 from refrigerating the determined compartment 1010. If required, processor 1510 may also direct the heating unit 1011 to provide some heat to the determined storage compartment 1010.

At some time before the pick-up time, processor 1510 should activate the storage compartment 1010 to open its topside 1015. It should also direct transport mechanism 1300 to pick up the bakery product and move it to a customization area 1070, such as customization compartment 1070. This area is an area in which a customization system can work on the bakery product to customize it.

Processor 1510 then starts customization system 1100 to customize the bakery product. This may involve using a decoration device 1120 to write custom messages provided by customer 3 with icing on the bakery product.

Alternatively, the processor 1510 may receive an image, break it into printable lines and print the image on the bakery product using edible vegetable dyes.

After customization, the transport mechanism 1300 may move the bakery product to a storage compartment 1010 to wait for the customer 3 to pick it up.

Or, the transport mechanism 1300 may move the bakery product to the packaging system 1700 for packaging. It may then move the bakery product to the vending system 1400 to be picked up at the pick-up compartment 1020.

A code to open the pick-up compartment 1020 is then sent to customer 3 which the customer types into the customer interface 1610 to open the pick-up compartment 1020.

Processor 1510 will operate the cleaning system 1131 to blow excess liquid food out of the lines 1127 and nozzle assembly 1128.

The processor 1510 may also operate the antimicrobial system 1139. This functions by activating the mechanical actuator 1121 of the decoration device 1120 to move the nozzle assembly 1128 to an anti-microbial light 1141, such as an ultra violet light, to kill or deactivate microbes growing on the nozzle assembly 1128.

In an alternative embodiment, the customization system 1100 moves to the storage compartment 1010 to customize the bakery product according to the customer 3 input.

Although a few examples have been shown and described, it will be appreciated by those skilled in the art that various changes and modifications might be made without departing from the scope of the invention, as defined in the appended claims.

What is claimed is:

1. An automated bakery kiosk comprising:
a plurality of temperature-controlled storage compartments each adapted to hold a bakery product;
a lockable pick-up compartment which can be accessed by a customer using a code;
a transport mechanism which can transport a bakery product from one of the storage compartments to another compartment where the customer may access the bakery product;
a customer interface adapted to receive customer input defining a desired a bakery product, and indicate a day and time to pick up the bakery product, wherein the customer interface acquires information as to how long it will take the customer to transport the bakery product to its intended destination;
at least one of a heating unit and refrigeration unit coupled to the storage compartments;
a customization system responsive to customer input from the customer interface to customize the bakery product;
a controller coupled to the customer interface, the storage compartments, the transport mechanism and the pick-up compartment and adapted to receive the customer input, then adjust a temperature of the storage compartment to thaw the bakery product to a temperature at the day and time it is intended to be picked up that will allow for the bakery product to be fully thawed when the customer reaches the intended destination, and operate the transport mechanism to move the bakery product to the pick-up compartment at a pick-up time and provide a code to the customer to use to open the lockable pick-up compartment.

2. The automated bakery kiosk of claim 1 wherein:
the customer interface is adapted to receive information as to custom bakery item decoration; and
the customization system further comprises a decoration device responsive to the customer interface to perform the custom decorations.

3. The automated bakery kiosk of claim 2 wherein the decoration device comprises:
a nozzle assembly which expels a liquid food used for decoration;
at least one line transporting the liquid food;
a liquid food source adapted to force liquid food through the lines to, and out of the nozzle assembly;
at least one nozzle actuator, coupled to the nozzle assembly which moves the nozzle assembly to desired locations on top of the bakery product to expel liquid food at these desired locations.

4. The automated bakery kiosk of claim 3 further comprising:
a pressurized air source coupled to the lines to provide compressed air through the lines to purge the liquid food from the lines and nozzle assembly after use.

5. The automated bakery kiosk of claim 3 further comprising:
a water source coupled to the lines to provide water through the lines to wash the lines and nozzle assembly after use.

6. The automated bakery kiosk of claim 3 further comprising:
an antimicrobial light source positioned to shine on and through the lines and nozzle assembly after use to reduce microbes on their surfaces.

7. The automated bakery kiosk of claim 3, further comprising:
a cleaning system comprising:
a steam source;
lines coupling the steam source to the nozzle assembly to expel excess liquid food out of the lines and nozzle assembly.

8. The automated bakery kiosk of claim 1, wherein:
the compartments are temperature-controlled and are coupled to at least one of a heater and a refrigeration unit that are controlled by the controller.

9. The automated bakery kiosk of claim 1, wherein the customer interface comprises:
a communication device coupled to the controller adapted to communicate with another computing device; and
a remote computing device having hardware and software adapted to receive customer input defining a bakery product and its customization and communicate this information to the communication device and controller.

10. The automated bakery kiosk of claim 1, wherein:
the storage compartments have actuators to open their top side,
the transport mechanism comprises:
a gantry frame, gantry legs and actuators, capable of picking up the bakery product out of a storage compartment through its open top side.

11. The automated bakery kiosk of claim 1 further comprising:
a packaging device which packages the customized bakery product prior to moving it to the pick-up compartment.

12. A method of automatically preparing and customizing bakery products comprising the steps of:
providing a plurality of bakery products in storage compartments;
receiving customer input to select a bakery product;
receiving customer input indicating customization of the bakery product, a pick-up time and date, and an intended destination;
determining a transport time between the storage compartments location and the intended destination;
automatically customizing the bakery product according to the customer input;
adjusting the temperature of the bakery product such that it is at a first temperature at the pick-up time and date, the first temperature associated with a partially thawed state that will allow for the bakery product to be fully thawed when the bakery product reaches the intended destination.

13. The method of claim 12 wherein the customer input indicates the bakery product desired, the size and bakery product customization options.

14. The method of claim 12 further comprising the step of:
packaging the customized bakery product with a packaging device prior to moving it to the pick-up compartment.

15. The method of claim 12 further comprising the step of:
determining if there is less than a minimum amount of materials immediately available to make and customize a bakery product as requested in the customer input;
indicating to the customer that the requested bakery product cannot be made at this time.

16. The method of claim 12 further comprising the step of:
automatically ordering the materials that were determined to be less than the minimum amount immediately available to replenish them.

17. An automated kiosk comprising:
a customer interface adapted to receive customer input defining a desired bakery product, at least one customization selection, a day and time to pick up the desired bakery product, and an intended destination for the desired bakery product a plurality of storage compartments each adapted to hold an individual bakery product;

at least one heating chamber functioning to thaw or heat the individual bakery product;

at least one refrigerated chamber functioning to cool or freeze the individual bakery product;

at least one customization device functioning to customize the individual bakery product;

at least one customization which can be accessed by the customization devices, where the individual bakery product is customized;

a transport mechanism which can transport the individual bakery product from one of the storage compartments to the customization area for customization, to one of a heated chamber for thawing or heating, a refrigeration chamber for cooling or freezing, and a pick-up compartment for pickup by a customer;

a controller coupled to the customer interface, the storage chambers, heating chambers, refrigeration chambers, customization system, transport mechanisms and lockable pick-up compartment and adapted to receive the customer input, operate the transport mechanism to transport the desired bakery product to one of the heating chamber or the refrigeration chamber to bring the bakery product to a first temperature at the pick up time and date, the first temperature associated with a partially thawed state that will allow for the desired bakery product to be fully thawed when the bakery product reaches the intended destination, and further operate the transport mechanism to move the bakery product to the pick-up compartment when the customer provides an appropriate code to access the customized bakery product.

18. The automated kiosk of claim 17 further comprising:
a plurality of sensors adapted to measure at least one of temperature, humidity and bacterial count at various locations within the automated kiosk, and
the controller is adapted to receive the temperature, humidity and bacterial count measured by sensors and act to make proper adjustments based upon the received measured information.

19. The automated kiosk of claim 17 wherein the materials are ordered through an electronic communication device.

* * * * *